US010851005B2

(12) United States Patent
Kirkendall

(10) Patent No.: US 10,851,005 B2
(45) Date of Patent: Dec. 1, 2020

(54) WATER PROVISION APPARATUSES AND RELATED METHODS

(71) Applicant: Vector Innovative Products, L.L.C., Twin Falls, ID (US)

(72) Inventor: Richard Todd Kirkendall, Twin Falls, ID (US)

(73) Assignee: Vector Innovative Products, L.L.C., Twin Falls, ID (US)

( * ) Notice: Subject to any disclaimer, the term of this patent is extended or adjusted under 35 U.S.C. 154(b) by 0 days.

(21) Appl. No.: 16/685,227

(22) Filed: Nov. 15, 2019

(65) Prior Publication Data

US 2020/0156977 A1   May 21, 2020

Related U.S. Application Data

(60) Provisional application No. 62/770,061, filed on Nov. 20, 2018.

(51) Int. Cl.
| | | |
|---|---|---|
| *C02F 9/00* | (2006.01) | |
| *B01D 61/02* | (2006.01) | |
| *B60S 3/00* | (2006.01) | |
| C02F 1/00 | (2006.01) | |
| C02F 1/42 | (2006.01) | |
| C02F 1/44 | (2006.01) | |

(52) U.S. Cl.
CPC .............. *C02F 9/00* (2013.01); *B01D 61/025* (2013.01); *B60S 3/00* (2013.01); *C02F 1/004* (2013.01); *C02F 1/42* (2013.01); *C02F 1/441* (2013.01); *C02F 2001/422* (2013.01); *C02F 2001/425* (2013.01); *C02F 2209/03* (2013.01)

(58) Field of Classification Search
CPC ........ B01D 29/50; B01D 29/56; B01D 36/02; B60S 3/00; B60S 3/04; B60S 3/041; C02F 1/001; C02F 1/002; C02F 1/283; C02F 1/42; C02F 9/00; C02F 9/005; C02F 2001/427; C02F 2201/006; C02F 2201/007; C02F 2201/008; C02F 2209/03; C02F 2209/40
See application file for complete search history.

(56) References Cited

U.S. PATENT DOCUMENTS

| | | | |
|---|---|---|---|
| 4,160,727 A | 7/1979 | Harris, Jr. | |
| 4,784,763 A | 11/1988 | Hambleton et al. | |
| 6,080,313 A * | 6/2000 | Kelada | C02F 9/005 |
| | | | 210/202 |
| 2003/0164333 A1 * | 9/2003 | Nohren, Jr. | A45D 33/008 |
| | | | 210/650 |

(Continued)

FOREIGN PATENT DOCUMENTS

CN    105650879    6/2016

OTHER PUBLICATIONS

International Search Report and Written Opinion dated Jan. 31, 2020 for international application PCT/US2019/061840.

*Primary Examiner* — Patrick Orme
(74) *Attorney, Agent, or Firm* — Stoel Rives LLP; Jeremy B. Barton

(57) ABSTRACT

Apparatuses and methods of treating, storing, and delivering water such that the water may be suitable for washing, rinsing, etc., without forming water spots on a surface or finish. The disclosed systems and methods may treat and store water by a combination of filtration, reverse osmosis, and/or ion exchange.

18 Claims, 11 Drawing Sheets

(56) References Cited

U.S. PATENT DOCUMENTS

| | | |
|---|---|---|
| 2011/0014066 A1 | 1/2011 | Gilpatrick |
| 2014/0124428 A1 | 5/2014 | Simonette et al. |
| 2014/0246517 A1 | 9/2014 | Raasch |

* cited by examiner

WATER PROVISION APPARATUSES AND RELATED METHODS

RELATED CASES

This application claims priority to U.S. Provisional Application No. 62/770,061, filed on Nov. 20, 2018 and titled "WATER PROVISION APPARATUSES AND RELATED METHODS," which is hereby incorporated by reference in its entirety.

TECHNICAL FIELD

The present disclosure relates generally to the field of water preparation and provision. More specifically, the present disclosure relates to preparing and storing water suitable for washing a vehicle.

BRIEF DESCRIPTION OF THE DRAWINGS

The present embodiments will become more fully apparent from the following description and appended claims, taken in conjunction with the accompanying drawings. Understanding that the accompanying drawings depict only example embodiments, and are, therefore, not to be considered limiting of the scope of the disclosure, the embodiments will be described and explained with specificity and detail in reference to the accompanying drawings.

DETAILED DESCRIPTION

Figure 1A:
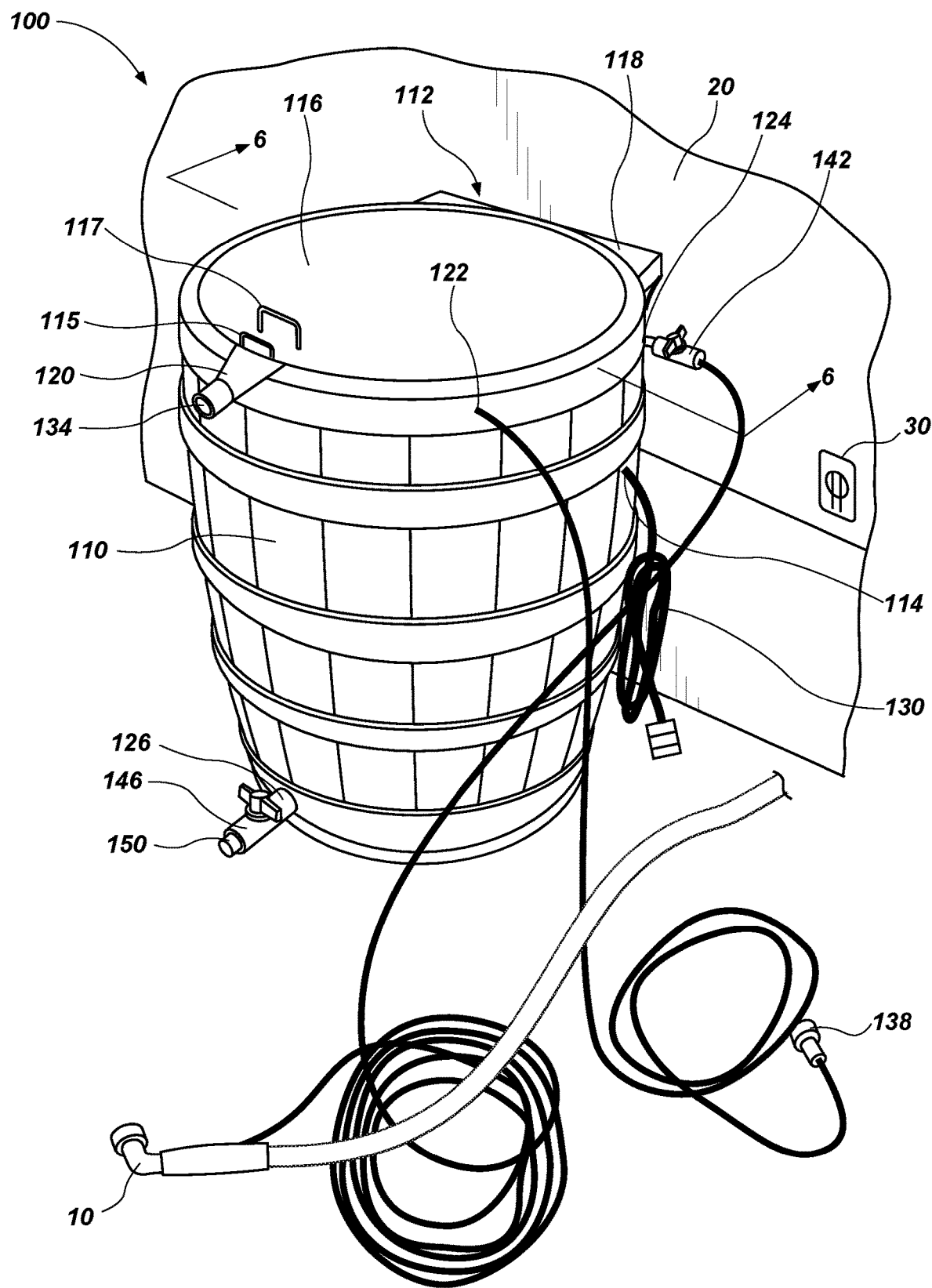
FIG. 1A is a perspective view of a water provision apparatus, according to some embodiments.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Untreated water, as used herein, refers to water which has not been treated so as to become particularly suitable for washing (e.g., including rinsing, etc.) of smooth surfaces (e.g., surfaces of a vehicle) without leaving significant water spots. Untreated water may comprise, by way of example without limitation, insoluble solids (e.g., sand, soil particles, vegetable debris, other insoluble solids, or combinations thereof), and soluble substances (e.g., carbon dioxide ($CO_2$), sugar ($C_{12}H_{22}O_{12}$), salt (NaCl), calcium (Ca), magnesium (Mg), other soluble substances, or combinations thereof). Insoluble solids suspended in water may damage a surface during washing, rinsing, etc., such as by scratching, abrading, etc. Soluble substances may dissolve in the water such that cations and anions of the soluble substance loosely bond with water molecules, and may then be transferred to molecules of a coating, finish, or material to which the water is applied during washing, rinsing, etc., and may then cause the coating, finish, or material to degrade. By way of example, the presence of insoluble solids in water used for washing, rinsing, etc., a vehicle may produce scratching, abrading, etc., of the vehicle finish. The presence of dissolved soluble substances in the water may chemically affect a vehicle finish. Untreated water may also leave water spots on a vehicle finish.

Treated water, as used herein, refers to water that has been treated using a particulate matter filter, a semipermeable membrane of a reverse osmosis unit, an ion exchange resin cartridge, or combinations thereof. Water that has been treated using a particulate matter filter to remove particulate matter that may have been present in the water prior to passing through the particulate matter filter may sometimes be referred to herein as "filtered water." Also, water that has been treated using a reverse osmosis unit by passing the water through a semipermeable membrane of the reverse osmosis unit may sometimes be referred to herein as "purified water." Furthermore, water that has been treated using an ion exchange resin cartridge may sometimes be referred to herein as "deionized water."

All, or nearly all, untreated water at earth surface standard conditions contains impurities in the form of dissolved minerals. The presence of minerals in water results in the electroconductivity/electroresistivity of water. For example, typical sea water has electroconductivity between 10,000 micro-siemens per centimeter (10K μohm/cm) and 50 K μohm/cm, and electroresistivity between 20 ohms and 100 ohms (20-100Ω). A typical city water supply delivers water with electroconductivity/-resistivity of 1,000 μohm/cm to 100 μohm/cm, and 1,000Ω (1 kΩ) to 10 kΩ. So-called pure water has electroconductivity/-resistivity of 1 μohm/cm to 0.1 μohm/cm, and 1 megaohm (MΩ) to 10 MΩ. Ultra pure water approaches 0.055 μohm/cm and 18.2 MΩ. Water in the range of pure and ultra pure water carries a risk of causing harm to some surfaces due to the great affinity of the water molecules to aggregate cations/anions.

Reject water refers to material, which may include water, that does not pass through the semipermeable membrane during reverse osmosis and that is directed away, such as to a reject or waste water drain.

Deionized (or de-ionized) water refers to water that has been through an ion exchange resin cartridge in order to replace cations and anions that are more harmful to a surface, finish, coating, or material of a vehicle with less harmful cations and anions, or by removing the cations and anions.

Water spot (and water spots) refers to an area of dried mineral deposits left on a surface after drying in ambient air. There may be a mineral presence in water as a result of dissolution of soluble substances or suspension of insoluble solids. All, or nearly all untreated water at earth surface normal conditions contain some amount of mineral. Water spots are unsightly and, left on a finish of a vehicle, for example, may affect the finish, causing it to degrade and/or diminish protective features of a finish. Attempts to remove water spots from a finish may actually damage the finish. Hence, it is preferable to avoid the creation of water spots in the first place.

Moreover, the phrases "connected to" and "coupled to" are used herein in their ordinary sense, and are broad enough to refer to any suitable coupling or other form of interaction between two or more entities, including mechanical, fluid, and thermal interaction. Two components may be connected or coupled to each other even though they are not in direct contact with each other.

The terms "a" and "an" can be described as one, but not limited to one. For example, although the disclosure may recite a tab having "a line of stitches," the disclosure also contemplates that the tab can have two or more lines of stitches.

Unless otherwise stated, all ranges include both endpoints and all numbers between the endpoints. As used herein, the term "substantially" indicates an accuracy within a tolerance such as thirty percent (30%), twenty percent (20%), ten percent (10%), five percent (5%), three percent (3%), two percent (2%), one percent (1%), or any of various fractions of one percent (1%). For example, the term "at least substantially flat" indicates a flatness that is within a predetermined tolerance level of a perfect plane.

Reference throughout this specification to "an embodiment," "the embodiment," or "some embodiments" means that a particular feature, structure, or characteristic described in connection with that embodiment or embodiments is included in at least one embodiment. Thus, "an embodiment," "the embodiment," "some embodiments," or variations thereof, as recited throughout this specification are not necessarily all referring to the same embodiment or embodiments. Embodiments disclosed herein are directed to treatment of water and provision of treated water, specifically for vehicle washing. Embodiments disclosed herein are low-cost as compared to prior systems while providing sufficient water to both wash and rinse a vehicle. Cost savings achieved by embodiments herein may arise, in part, from a relatively low speed (e.g., in gallons per minute) of water flowing through an ion exchange unit, which extends the life of the ion exchange unit. Also, embodiments disclosed herein treat water using a particulate matter filter, a reverse osmosis unit, an ion exchange unit, or combinations thereof. In embodiments where both a reverse osmosis unit and an ion exchange unit are used, an at least substantially spot free wash may be achieved, in contrast to reverse osmosis systems that are inadequate for a truly spot free wash. Washing without high purity treated water can cause spotting during the wash, especially on hot, sunny summer days, making it difficult to avoid scale deposits on the vehicle prior to a rinse. Furthermore, embodiments disclosed herein provide sufficient storage to both wash and rinse a vehicle.

Since this volume of water is stored, a temperature of the treated water may have sufficient time between washes to rise to an ambient temperature level, or even higher if placed in the sun. As a result, the temperature of the treated water provided may be much warmer than water provided by a city system, and may therefore be more suitable for washing a vehicle.

Figure 6:
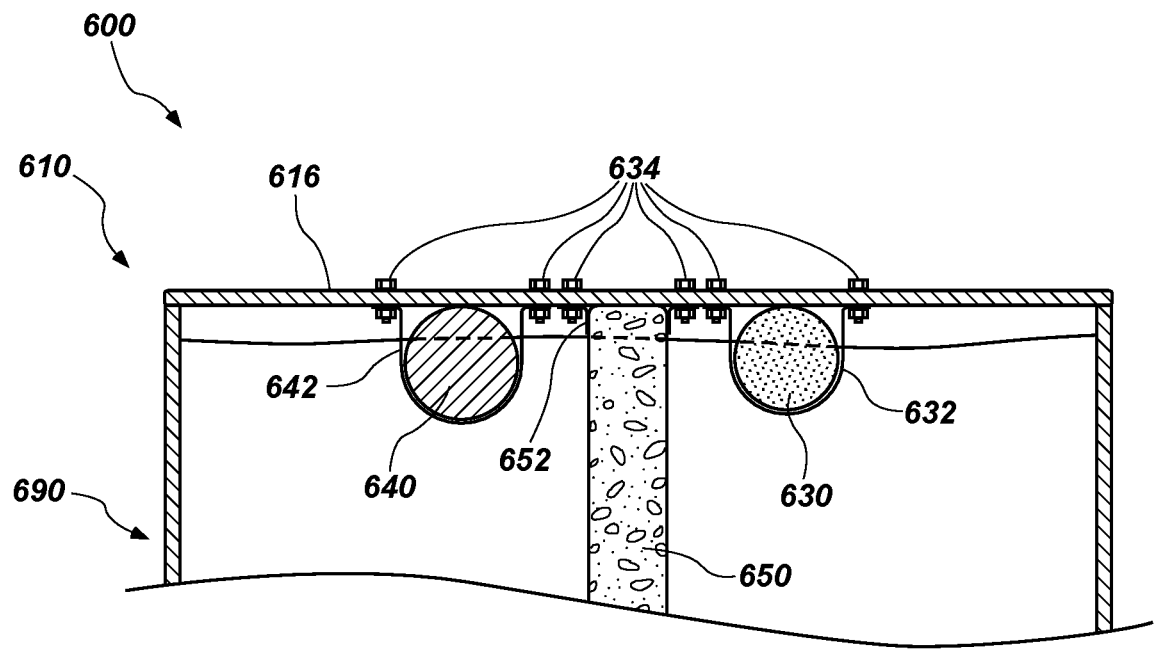
FIG. 6 is a cross-sectional view of an example water provision apparatus, according to some embodiments.
Figure 7:
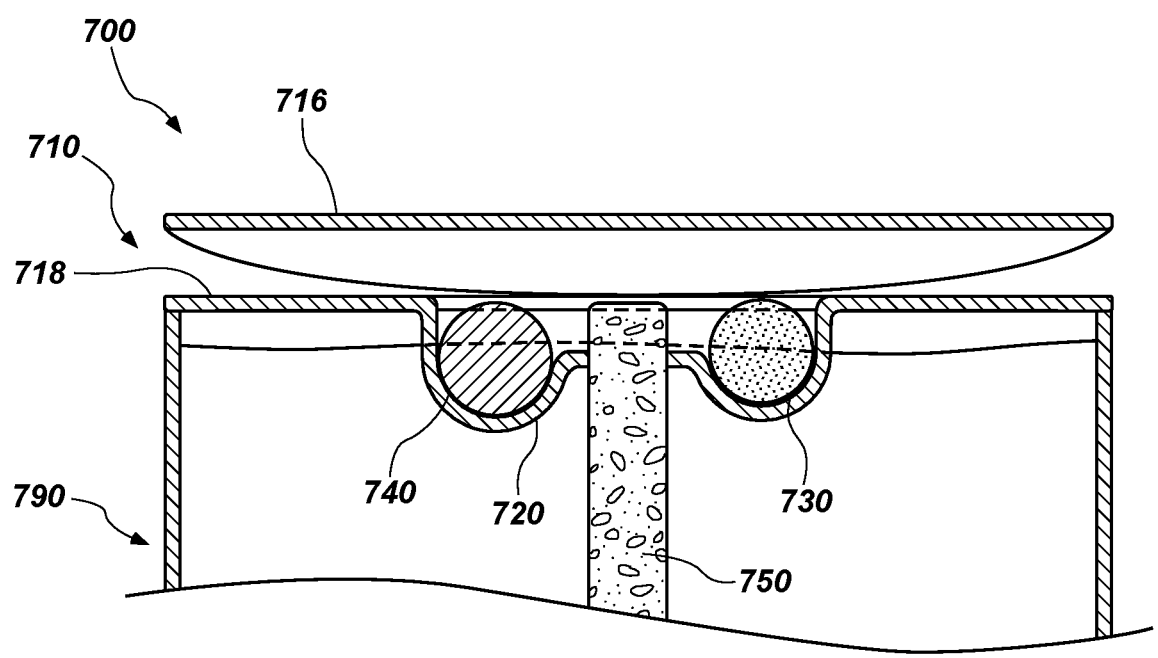
FIG. 7 is a cross-section view of a water provision apparatus, according to some embodiments.

FIG. 1A is a simplified perspective view of a water provision apparatus 100, according to some embodiments. In some embodiments, the water provision apparatus 100 includes a vehicle wash water provision apparatus. FIG. 1A includes lines 6 indicating a location of a cross-section for a cross-sectional view, which is illustrated in FIGS. 6-7. The apparatus 100 includes a storage container 110 configured to seal treated water stored therein from contaminants in ambient air. The storage container 110 is also configured to house one or more water treatment devices (e.g., a particulate matter filter, a reverse osmosis filter, an ion exchange cartridge, other water treatment devices, or combinations thereof) to produce treated water from untreated water. The storage container 110 may be formed of material suitable for placement, by way of example without limitation, inside a residential or commercial garage; outdoors on a patio, driveway, walkway, etc.; or outdoors adjacent a building, etc. The storage container 110 may comprise an at least substantially flat exterior portion 112 which may permit the storage container 110 to be placed closely adjacent and flush with, for example without limitation, a wall 20 as shown in FIG. 1A, or a fence, etc. In some embodiments, the storage container 110 may be configured to store about fifteen (15 gals.) or more of treated water and be stationary or portable. This quantity of water may be sufficient to provide high purity treated water for an entire vehicle wash, rather than merely for a rinse phase.

The apparatus 100 also includes a lid 116 to cover the storage container 110. The lid 116 may couple at an upper portion of the storage container 110 so as to enclose an opening in the upper portion of the storage container 110. In the illustrated embodiment, the lid 116 is a full diameter. The lid 116 may couple to the storage container 110, for example, via a hinge 118 so that the lid 116 may be articulable to allow access to an interior of the storage container 110. The lid 116 may further comprise a handle 117 to facilitate opening the lid 116. The lid 116 may be configured to seal the storage container 110 (e.g., an airtight seal). Since deionized water has a tendency to recharge itself, the storage container 110 may be configured to seal out contaminants and filter air introduced via displacement of the treated water within the storage container 110. As a result, the storage container 110 may be capable of storing treated water for extended periods of time.

The storage container 110 may define a power cord aperture 114, a pressure valve aperture 120, a water inlet aperture 122, a reverse osmosis (RO) rejection aperture 124, and a water outlet aperture 126 through an exterior wall (e.g., the wall 111 of FIG. 1C) of the storage container 110. A power cord 130 may couple to an external electrical power source 30 and pass through the power cord aperture 114 to provide electrical power to a booster pump (see 330 in FIG. 3A) within the storage container 110. The power cord aperture 114 seals around the power cord 130 to prevent fluid (e.g., water, air, or both) communication between an interior of the storage container 110 and an exterior of the storage container 110 through the power cord aperture. Apertures 120, 122, 124, 126 may permit fluid communication between the interior of the storage container 110 and the exterior of the storage container 110, as further described below. Penetrations for power cord and tubing may be tight tolerance. For tubing, the tight fit maintains an air tight seal on drum while securing tubing to eliminate the need for additional support brackets, fittings, or hose clamps. A tight tolerance for the booster pump power cord serves to maintain an air tight seal and limit a pump's ability to shift when the apparatus 100 is moved or in transit.

In some embodiments the apparatus 100 includes a water inlet coupling 138. The water inlet coupling 138 may couple to an external water source and pass through the water inlet aperture 122 to deliver untreated water from the external water source to the apparatus 100. For example, the water inlet coupling 138 may couple with a water supply 10 (FIG. 5) to receive untreated water from the water supply 10 and deliver the untreated water into the apparatus 100 through the water inlet aperture 122 for treatment.

The apparatus 100 further includes a back pressure regulation valve 142. The reject water drain may couple to a reverse osmosis unit (e.g., the reverse osmosis unit 180 of FIG. 2A) inside the storage container 110 and receive, from the reverse osmosis unit, reject water so as to drain the reject water through the back pressure regulation valve 142 to an exterior of the storage container 110. The back pressure regulator may enable a user to adjust for fluctuating water supply pressures and membrane flashing (plugging). This enables maintenance of optimum back pressure against the RO membrane through the life cycle of the RO unit 180 and adjustment for feed supply pressure changes to get a higher permeate percentage, minimizing reject water.

The apparatus 100 also includes a water outlet valve 146. The water outlet valve 146 may couple at the water outlet aperture 126 or further down a hose extending from the water outlet aperture 126 to permit treated water to be drawn out of the storage container 110. By way of example without limitation, an external water line or hose 9 may couple via a water outlet fitting 150 to the water outlet valve 146 so that treated water may be delivered to the external water line or hose 9 (e.g., to be delivered to a pressure washer).

The apparatus 100 includes an overflow device 134 including a pressure relief valve (PRV), a vacuum relief valve (VRV), and a particle matter (PM) filter. The overflow device 134 may couple at the pressure valve aperture 120. The overflow device 134 may operate to exhaust treated water to prevent overfilling of the storage container 110, and also so as to approximately equalize the pressure within and without the storage container 110. In other words, a hot ambient temperature may cause treated water and air within the storage container 110 to expand, the pressure within the storage container 110 may increase above an ambient air pressure, and the overflow device 134 may operate to permit air or water to escape to an exterior of the storage container 110 so as to approximately equalize the pressure within the storage container 110 with an ambient air pressure. Similarly, if cool conditions cause contraction of the treated water and any air within the storage container 110, the overflow device 134 may operate to permit sufficient ambient air to enter the storage container 110 so as to approximately equalize the pressure within the storage container 110 with an ambient air pressure. Also, as the storage container 110 fills with treated water or empties during use of the apparatus 100, air may enter or escape the storage container 110 through the overflow device 134. The particle matter filter of the overflow device 134 may comprise a filter to prevent airborne contaminants from entering the storage container 110 through the overflow device 134.

In some embodiments the storage container 110 may further comprise a hasp 115 or other component to receive a lock. The lid 116 may be configured to allow the hasp 115 to pass through a portion of the lid 116 such as to permit the hasp 115 to receive a lock whereby the lid 116 may be secured against opening by, for example, a child, an animal, a gust of wind, etc.

Figure 1C:
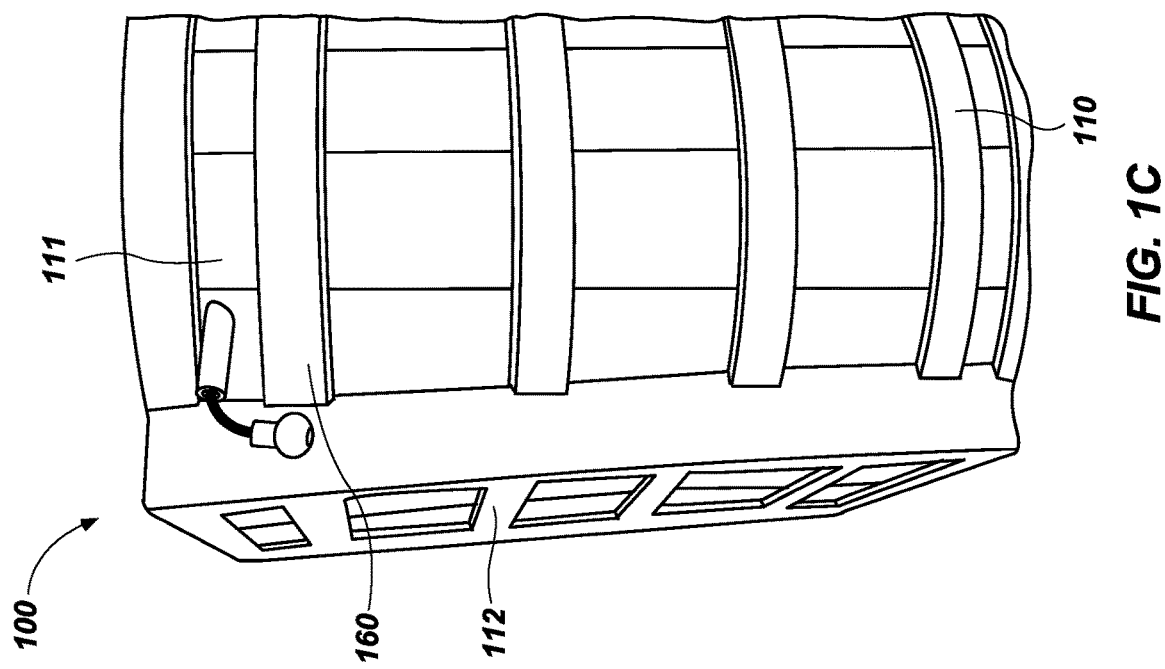
FIG. 1C is a side perspective view of a portion of a storage container of the water provision apparatus of FIGS. 1A-1B.
Figure 1B:
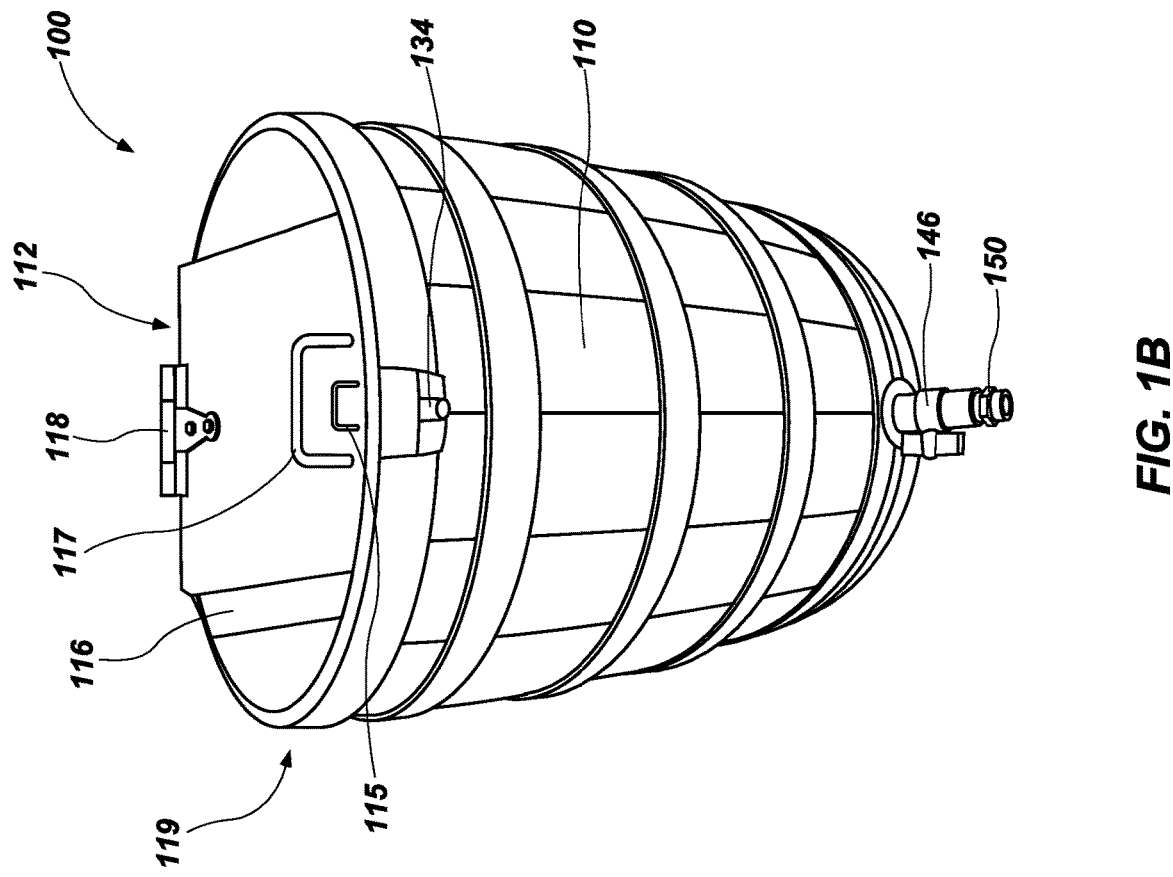
FIG. 1B is front perspective view of the water provision apparatus of FIG. 1A.

FIG. 1B is a simplified front perspective view of the water provision apparatus 100 of FIG. 1A. As previously discussed, the lid 116 is coupled via the hinge 118 to the storage container 110. In an embodiment wherein the storage container 110 comprises the flat exterior portion 112, the hinge 118 may be disposed at an upper portion of the flat exterior portion 112. The handle 117 of the lid 116 and the hasp 115 of the storage container 110 may be located distally to the hinge 118. The overflow device 134 may be disposed near an upper portion of the storage container 110 at an appropriate overflow level of the storage container so as to vent air out of or into the storage container 110 to maintain an approximate equilibrium between pressure inside the storage container 110 and an ambient air pressure. The water outlet valve 146 is disposed near a bottom of the storage container 110 (e.g., to allow gravity feed discharge of water from the storage container 110). The water outlet fitting 150 is shown rigidly affixed to the water outlet valve 146; however, the water outlet fitting 150 may be coupled to the water outlet valve 146 semi-rigidly, or by a flexible component such as a hose or tube (not shown).

The storage container 110 may be formed of any suitable material, such as, by way of example without limitation, a polymeric or resin material having a high resistance to ultraviolet light. In some embodiments the storage container 110 is configured to enable the treated water to be heated by sunlight when the storage container 110 is placed in sunlight. For example, the storage container 110 may be formed of a material capable of absorbing solar heat energy and transferring the solar heat energy to treated water within the storage container 110. The storage container 110 may be configured to have any of a variety of decorative appearances. For example, the storage container 110 may include a decorative container including a decorative texture of at least a portion of an outer surface of the decorative container. Both the shape of the storage container 110 and the surface texture may vary from one embodiment to another without change to the functionality of the water provision apparatus 100. By way of example without limitation, the storage container 110 may have both the shape and surface design of a wooden barrel, as shown in FIGS. 1A-1B. The storage container 110 may be shaped like a basket or an ornamental vase, and have a basket weave or other texture. The storage container 110 may have rectilinear sides with the appearance of panels (raised, flat, moulded, etc.). The storage container 110 may have an appearance of stone or rock structure, a firewood box, and many others. In some embodiments, the storage container 110 may have a generally flat exterior portion 112 suitable for placing the storage container 110 adjacent a wall, a fence, or other structure. In other words, the storage container 110 may have an appearance suitable for use in a variety of architectural settings, such as a Victorian or Elizabethan house, a modern townhouse, a country farm, etc.

FIG. 1C is a simplified side perspective view of a portion of the storage container 110 of the water provision apparatus 100 of FIGS. 1A-1B. The at least substantially flat exterior portion 112 is shown for reference. In the embodiment of FIG. 1C, a float valve 160 is coupled at and through an upper portion of an exterior wall 111 of the storage container 110 so as to regulate a level of stored treated water within the storage container 110. In some embodiments, the float valve 160 may be mounted at the lid 116 or other suitable location.

Figure 2A:
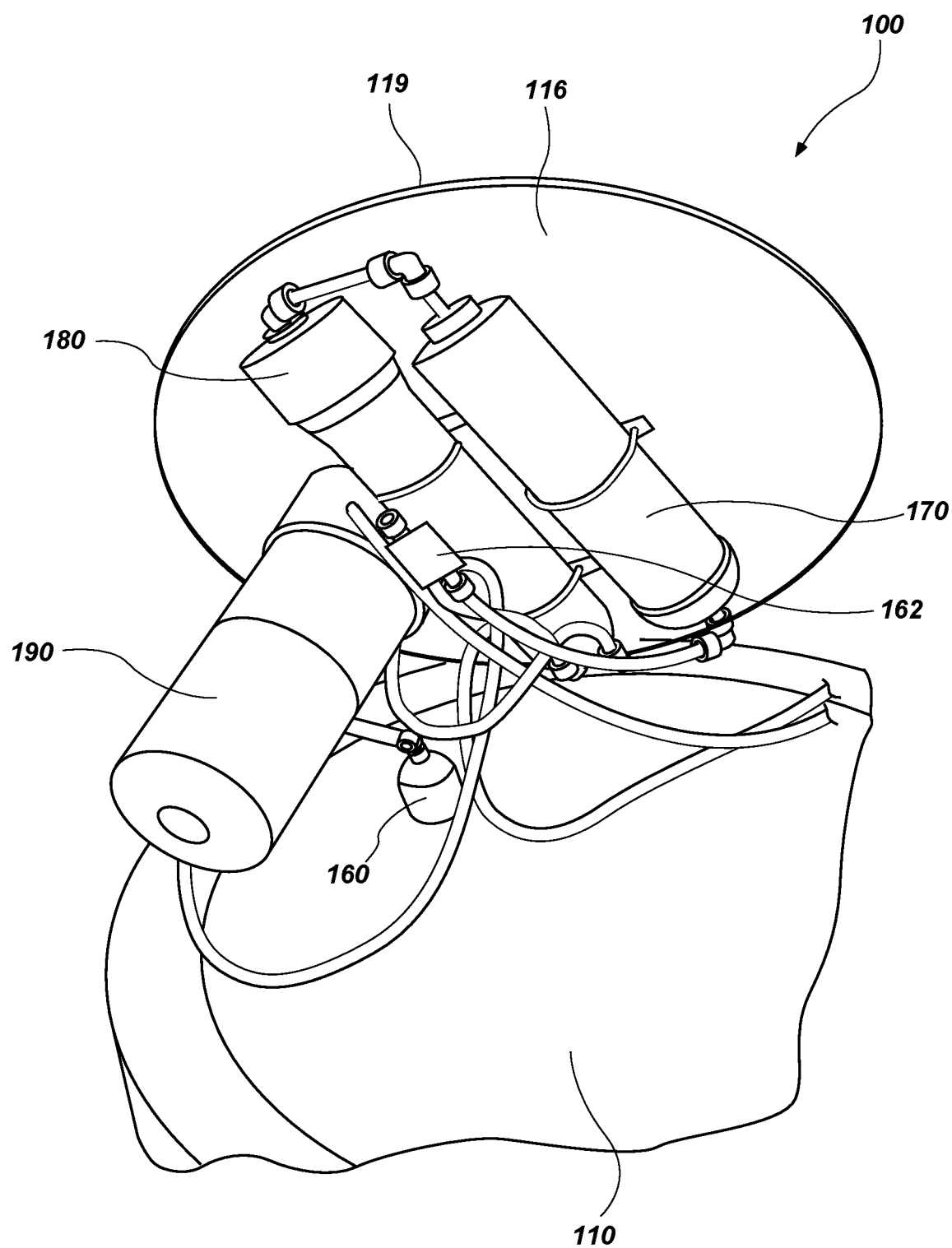
FIG. 2A is a perspective view of an underside of a lid of the water provision apparatus of FIGS. 1A-1C.

FIG. 2A is a simplified perspective view of an underside or bottom of the lid 116 of the water provision apparatus 100 of FIGS. 1A-1C. In some embodiments, one or more water treatment devices may be coupled to an underside of the lid 116. When the lid 116 is closed the components coupled thereto may enter into the storage container 110 to be housed within the storage container 110 during operation of the water provision apparatus 100. For example, coupled to the underside of the lid 116 are a particulate matter filter (also "PM filter" or—"particulate filter") 170, a reverse osmosis unit (also "RO unit" or "RO filter") 180, and an ion exchange unit (also "IX unit" or "IX resin cartridge") 190. In some embodiments, the IX unit 190 may be mounted such that the IX unit 190 extends at least substantially perpendicularly away from the lid 116 so that the IX unit 190 is in an at least substantially vertical orientation when the lid 116 is closed in a horizontal orientation. Vertical orientation of the IX unit 190 allows for optimum contact and flow distribution through a resin cartridge to avoid water channeling, which improves efficiency and ensures a high deionization quality of treated water through a lifetime of the resin. With RO pretreatment, an IX unit 190 having a 2.5 inch by 10 inch resin canister may consistently produce 1,800 gallons or more of zero to five mega ohm quality treated water. With RO pretreatment, an IX unit 190 having a 4.5 inch by 20 inch resin canister may consistently produce 8,500 gallons or more of zero to five mega ohm treated water. In some embodiments, the IX unit 190 may include a resin cartridge including a twin bed, cation and anion resin designed to provide a water purity not to exceed 100,000 ohms centimeter (100 KΩ-cm). In some embodiments, the IX unit 190 may include a strong acid cation and a weak base anion resin. In some embodiments, the IX unit 190 may include a flat top filter cartridge that can be directly mounted to the underside of the lid 116 or underside of container top without a special mounting. In some embodiments the IX unit 190 may allow silica and carbon dioxide to pass, which produces treated water that is not corrosive to metals, such as aluminum and other metals found in some vehicles, and extends a lifetime of the resin. In some embodiments, the resin may include a non-color-changing resin, which may have a longer lifespan than a color-changing resin.

The arrangement of the PM filter 170, RO unit 180, and the IX unit 190 in FIG. 2 is an example of one arrangement, and other arrangements are contemplated by this disclosure. A pressure-sensitive solenoid ("solenoid") 162 is shown coupled at the RO unit 180. The solenoid 162 may be coupled to the water provision apparatus 100 at other locations, such as, by way of example without limitation, to the underside of the external cover 116, at the IX unit 190, to an interior wall of the storage container 110, etc.

The water supply line (see 138 in FIG. 1A) may pass through the water inlet aperture (see 122 in FIG. 1A) and couple to the solenoid 162. The water inlet coupling 138 may couple, in series, the solenoid 162, the PM filter 170, the RO unit 180, the IX unit 190, the solenoid 162, and the float valve 160, respectively. When water (e.g., nominally untreated water) flows through the water inlet coupling 138, the water passes through the solenoid 162, the PM filter 170, the RO unit 180, the IX unit, the solenoid 162 again (or, in some embodiments, through a second solenoid), and the float valve 160. The use of the solenoid 162 may ensure that water flows through the water provision apparatus 100 only when the float valve 160 is open. In some embodiments, the solenoid 162 ensures that water only flows through the components of the water provision apparatus 100 in the serial order indicated above. In some embodiments, wherein the float valve 160 is configured to cut off supply of the purified water to the IX unit 190 when the level of the treated water exceeds a threshold level, but a pressure sensitive solenoid (discussed below) is configured to allow a trickle flow to continue on an outer surface of a membrane of the RO unit 180 when the level of the treated water exceeds the threshold level.

The lid 116 may comprise a gasket 119 or be otherwise configured to form a seal, when closed to the storage container 110, between an interior of the storage container 110 and an exterior environment.

Figure 2B:
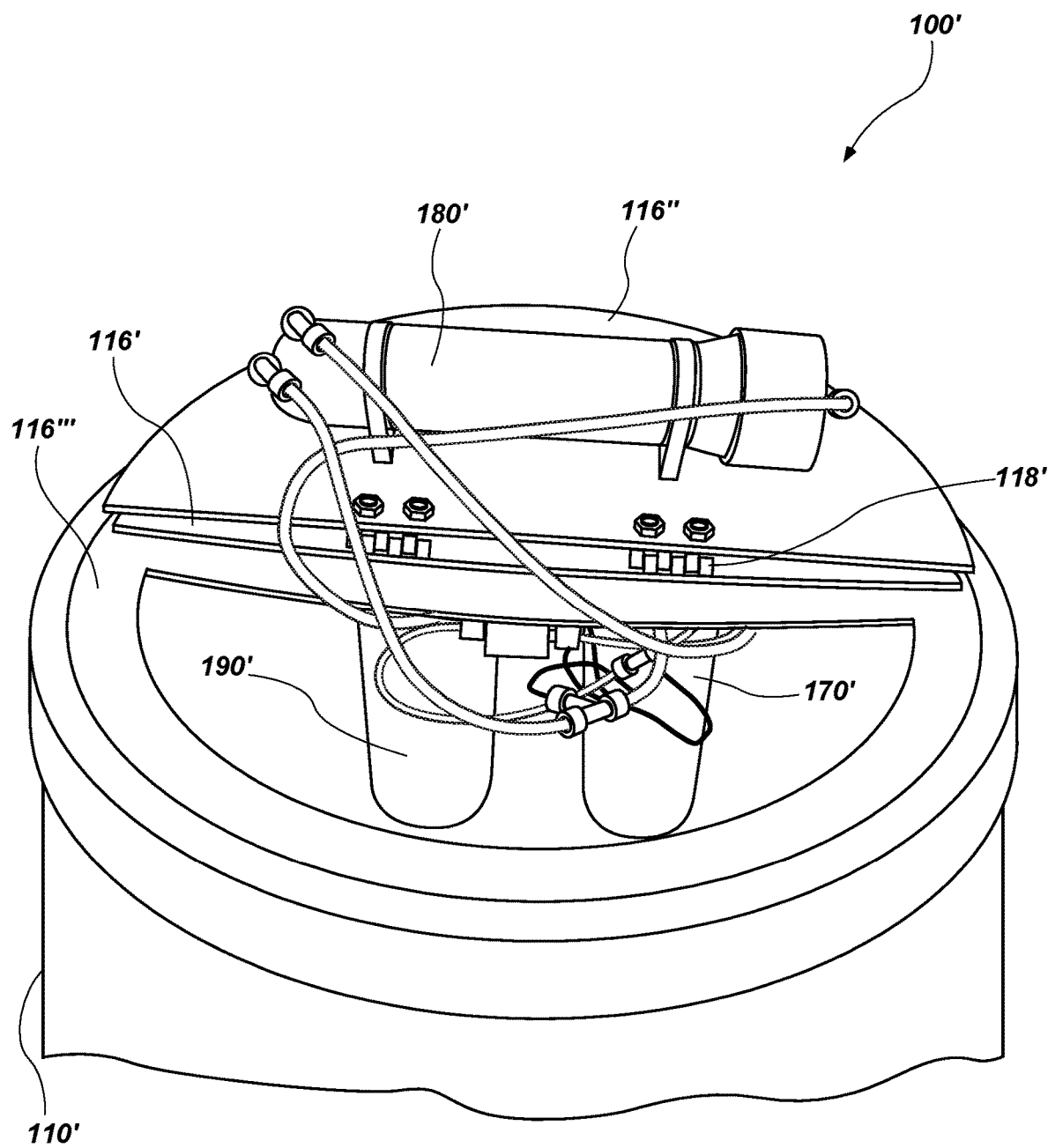
FIG. 2B is a perspective view of an underside of a lid of the water provision apparatus according to some embodiments.

FIG. 2B illustrates a water provision apparatus 100' according to one embodiment of the present disclosure. The water provision apparatus 100' includes a storage container 110' and a lid to cover the storage container 110'. In the illustrated embodiment, the lid is a spilt lid configuration with a partial diameter. The spilt lid may comprise two portions, a first portion 116' and a second portion 116". In some embodiments, the lid may comprise a third portion 116'" that forms in opening in the lid, the third lid 116'" works in conjunction with the first portion 116' and the second portion 116". The lid may couple at an upper portion of the storage container 110' so as to enclose the opening in the upper portion of the storage container 110.' The second portion 116" of the lid may couple a first portion 116' of the lid, for example, via a hinge 118' so that the second portion 116" of the lid may be articulable to allow access to an interior of the storage container 110' through the opening. The lid may further comprise a handle (not shown) to facilitate opening the second portion 116" of the lid. The second portion 116" of the lid may be configured to seal the storage container 110' (e.g., an airtight seal). Since deionized water has a tendency to recharge itself, the storage container 110' may be configured to seal out contaminants and filter air introduced via displacement of the treated water within the storage container 110'. As a result, the storage container 110' may be capable of storing treated water for extended periods of time.

In some embodiments, one or more water treatment devices may be coupled to an underside of the second portion 116" and the third portion 116'" of the lid. In the illustrated embodiment, an RO unit 180' is coupled to an underside of the second portion 116" of the lid and a PM filter 170' and an IX unit 190 may be coupled to an underside of the third portion 116'" of the lid that coincides with the first portion 116' of the lid.

Figure 3A:
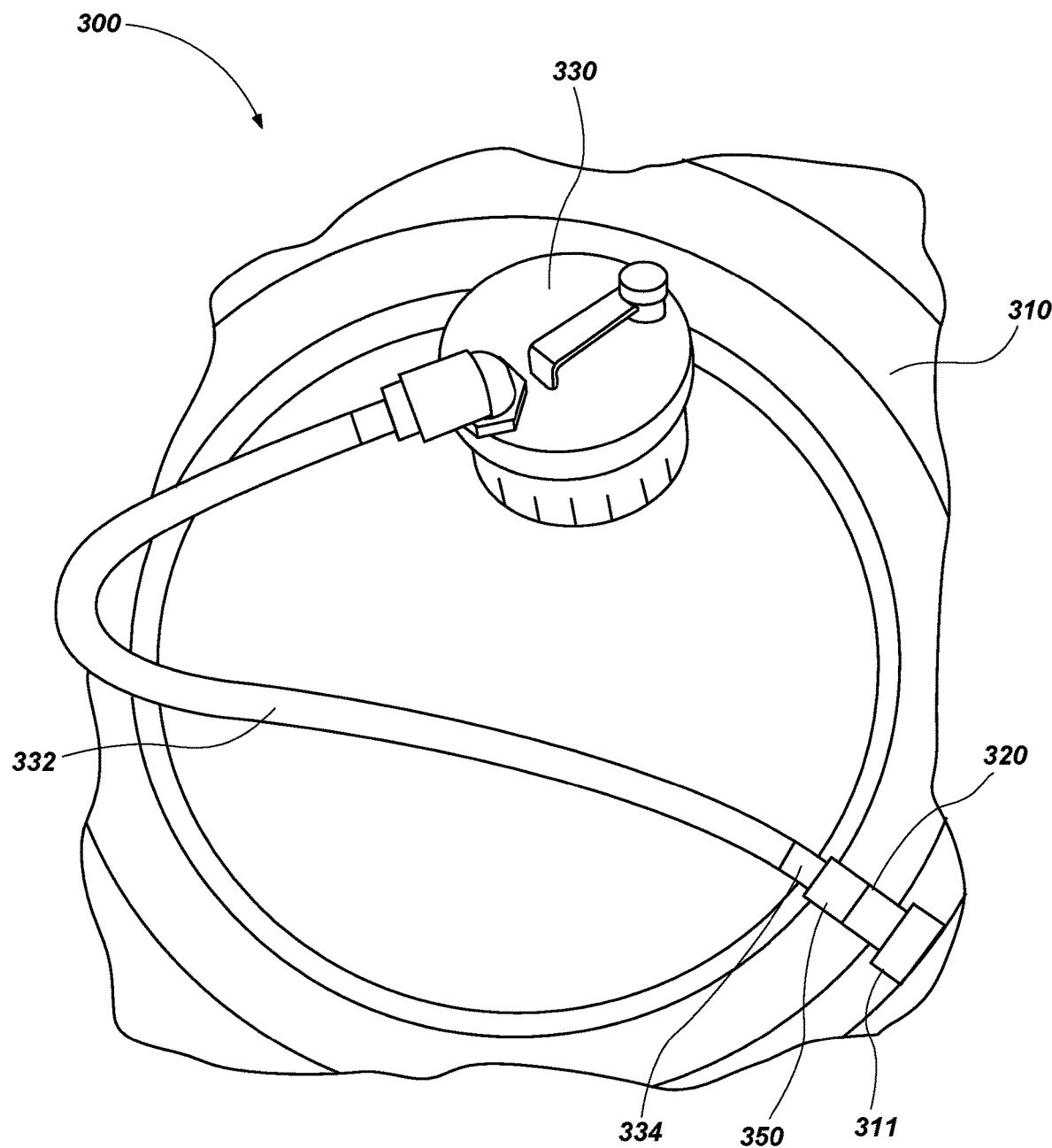
FIG. 3A is a top perspective view of an interior of a storage container of a water provision apparatus, according to some embodiments.

FIG. 3A is a simplified top perspective view of an interior of a storage container 310 of a water provision apparatus 300, according to some embodiments. The water provision apparatus 300 may be similar to the water provision apparatus 100 of FIGS. 1A-2. It will be understood that it is contemplated herein that elements of the apparatus 100 and the apparatus 300 may be combined. The water provision apparatus 300 comprises a booster pump 330. The booster pump 330 may be disposed to rest in water on an interior bottom of the storage container 310 when water is present. The booster pump 330 may be configured with an extended intake (not shown) such that the booster pump 330 may be located elsewhere in or on the water provision apparatus 300, provided that the intake is disposed within water at the bottom of the storage container 310 when water is present. A hose or tube 332 may couple 334 the booster pump 330 to a water outlet fitting (or water outlet) 350, which is further coupled to a water outlet aperture 320. The water outlet fitting 350 and the water outlet aperture 320 may be similar to the water outlet fitting 150 and the water outlet aperture 120 discussed above. In some embodiments the water outlet fitting 350 may comprise a single-piece fitting. In some embodiments the water outlet fitting 350 may be formed integrally with the storage container 310. In some embodiments, the water outlet fitting 350 may include a (e.g., brass) 1.5 inch to two inch depth male MPT (male pipe thread) by ¾ inch female threaded ¾ inch pipe fitting to allow for direct connection to the internal booster pump and, by way of example without limitation, an external ball valve/garden hose.

The booster pump 330 may be configured to deliver treated water to the water outlet fitting 350 under pressure. In some embodiments, the booster pump 330 is configured to pressurize the treated water to sufficient pressure to feed and/or prime, from the water outlet, a pressure washer, if desired. By way of non-limiting example, the pressure may be approximately ten to twenty pounds per square inch (10-20 psi). In some embodiments, from the storage container 310 to any pressure washer connected thereto, no fitting or hose may have an inner diameter of less than 0.59 inches to prevent cavitation on the pressure washer.

In some embodiments, a pressure washer motor and pump producing approximately 1,700 to 2,500 psi so as to discharge the treated water at a rate of approximately 1.2 to 6 gallons per minute (gpm) may be housed within the storage container 310 instead of or in addition to the booster pump 330. In such embodiments the water provision apparatus 100 itself may be capable of providing a pressure wash without the need for an external pressure washer.

Figure 3B:
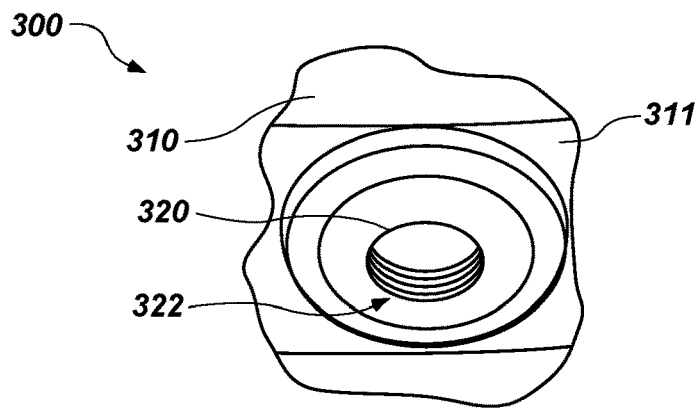
FIG. 3B is a perspective view of a water outlet aperture of the storage container of the water provision apparatus of FIG. 3A.

FIG. 3B is a simplified perspective view of the water outlet aperture 320 of the storage container 310 of the water provision apparatus 300 of FIG. 3A. The water outlet aperture 320 may be disposed through, and near a bottom of a wall 311 of the storage container 310. In some embodiments, the water outlet aperture 320 may be configured with threading 322 to receive the water outlet fitting 350 of FIG. 3A.

Figure 3C:
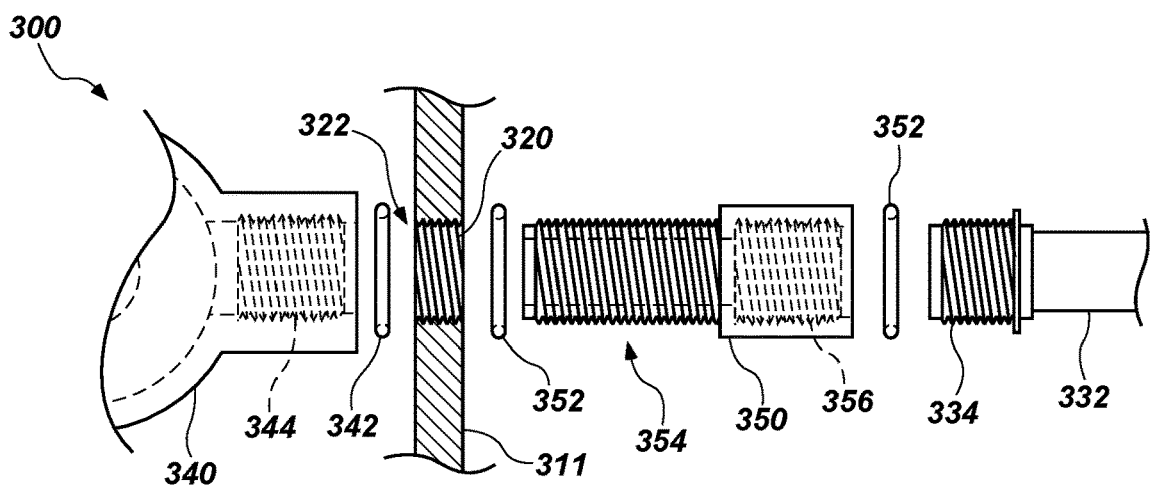
FIG. 3C is an exploded cross-sectional side view of components at the water outlet aperture of the water provision apparatus of FIGS. 3A-3B.

FIG. 3C is a simplified exploded cross-sectional side view of components at the water outlet aperture 320 of the water provision apparatus 300 of FIGS. 3A-3B. The hose 332, a portion of a water outlet valve 340, and a water outlet fitting 350, as well as the water outlet aperture 320 passing through a portion of the wall 311 of the storage container 310 are shown. The water outlet valve 340, the water outlet aperture 320, the water outlet fitting 350, and the hose 332 are each configured with threading 344, 322, 354 and 356, and 334, respectively. It should be noted, however, that in some embodiments the water outlet fitting 350 may be formed integrally with the wall 311 of the storage container 310, in which case the threading 322, 354 would not be needed. The threading 344, 322 of the water outlet valve 340 and the water outlet aperture 320 conform to the threading 354 of the water outlet fitting 350. The threading 334 of the hose 332 conforms to the threading 356 of the water outlet fitting 350. The water outlet fitting 350 may be coupled through the water outlet aperture 320 via the matching threading 354 and 322. A washer 352, or other component, may be coupled about the water outlet fitting 350 threading 354 so as to be disposed between the water outlet fitting 350 and a portion of the wall 311 to form a water tight seal. The valve 340 may be coupled via the threading 344, 354 to a portion of the water outlet fitting 350 which may protrude from the water outlet aperture 320 when the water outlet fitting 350 is disposed through the water outlet aperture 320. A washer 342, or other component, may be disposed about the threading 354 of the water outlet fitting 350 protruding from the water outlet aperture 320 so as to be disposed between the water outlet valve 340 and the wall 311 to form a water tight seal. The hose 332 may couple via the threading 334, 356 to the water outlet fitting 350. A washer 352 may be disposed about the threading 334 of the hose 332 so as to be disposed between a portion of the hose 332 and a portion of the water outlet fitting 350 to form a water tight seal.

In one embodiment, the water outlet valve 340 may be omitted and a common hose fitted directly to a portion of the water outlet fitting 350 protruding from the water outlet aperture 320.

Figure 3D:
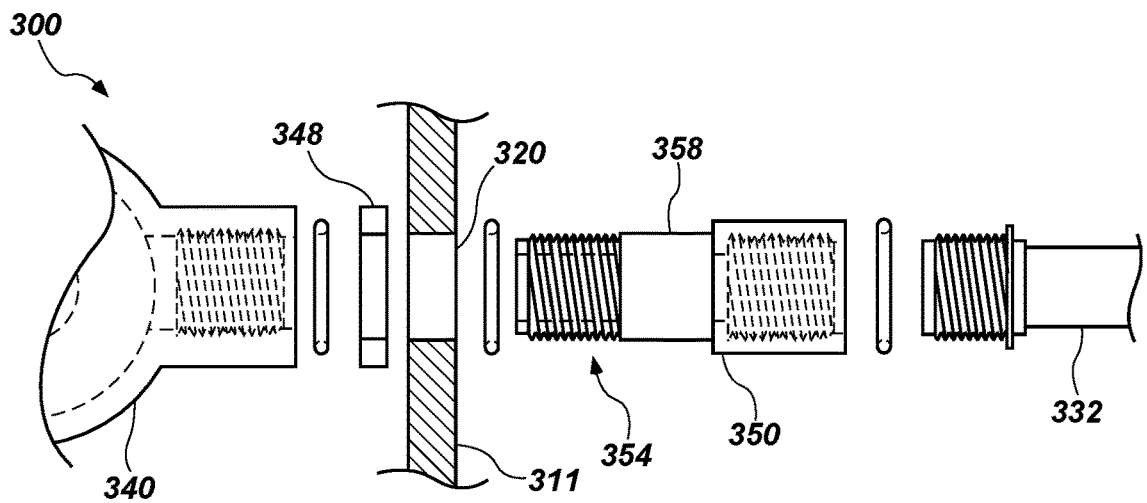
FIG. 3D is an exploded cross-sectional side view of components at the water outlet aperture, according to some embodiments.

FIG. 3D is a simplified exploded cross-sectional side view of components at a water outlet aperture 320, according to some embodiments. In the embodiments illustrated by FIG. 3D, the water outlet aperture 320 is not threaded. The water outlet fitting 350 is configured with a non-threaded portion 358 adjacent the threading 354. The water outlet fitting 350 may be configured such that the threading 354 passes completely through the water outlet aperture 320 and the non-threaded portion 358 of the water outlet fitting 350 is disposed through and within the water outlet aperture 320. The water outlet valve 340 may couple to the water outlet fitting 350 as described in FIG. 3C. A spacer 348 may be disposed about a portion of the water outlet fitting 350 protruding from the water outlet aperture 320 so as to be between the wall 311 and the water outlet valve 340 and to ensure a tight fit. The hose 332 may couple to the water outlet fitting 350 as described in FIG. 3C. Yet other configurations of the water outlet aperture 320 and water outlet fitting 350 are contemplated by the disclosure.

Figure 4:
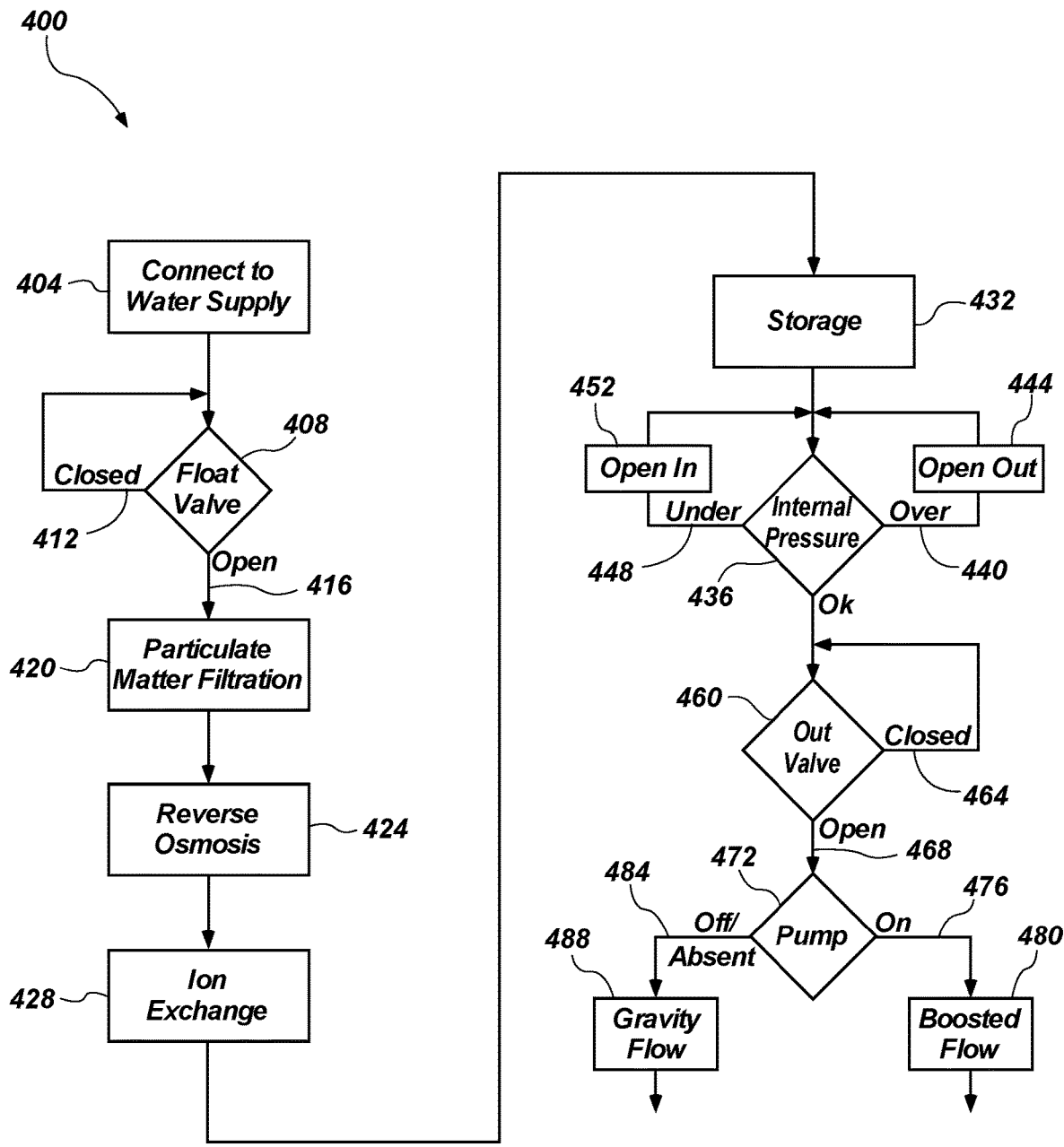
FIG. 4 is a flow diagram illustrating an example of operation of a water treatment system, according to some embodiments.

FIG. 4 is a simplified flow diagram illustrating an example of operation of a water treatment system 400, according to some embodiments. The water treatment system 400 may be included in a water provision apparatus, such as the water provision apparatus 100, 300 (FIGS. 1A-3D), and housed within a storage container, such as the storage container 110, 310 (e.g., the same storage container that houses the treated water). The water treatment system 400 may be connected 404 to a water supply whereby untreated water may be supplied to the water treatment system 400. A float valve 408 may, by operation of a float, be closed 412 when a level of treated water within a storage container is at or above a threshold level. In some embodiments, when the float valve 408 is closed 412, a pressure sensitive solenoid (discussed below) may allow a trickle flow to continue on an outer surface of a membrane of the RO unit. The float valve 408 may open 416 when the level of treated water within the storage container falls below a threshold level. With the float valve 408 open 416, the supplied water is directed through a particulate matter filter 420, a reverse osmosis unit 424, and an ion exchange unit 428 to treat the supplied water. The treated water is delivered to a storage container 432.

An overflow device is disposed and configured to open out 444 if the internal pressure 436 (the pressure within the storage container 432) of the water treatment system 400 is over 440 (e.g., exceeds) an ambient air pressure so as to vent air and/or water out of the storage container to equalize the internal pressure 436 with the ambient air pressure. The overflow device is further configured to open 452 if the internal pressure 436 is under 448 (e.g., less than) an ambient air pressure so as to admit air into the storage container to equalize the internal pressure 436 with the ambient air pressure. When the overflow device is open 452 to admit air into the storage container, the air is passed through a particle matter filter (not shown) to prevent introduction of airborne matter that may affect the treated water within the storage container.

The water treatment system 400, regardless of the internal pressure 436 and the state of the overflow device, waits on the water outlet valve 460. With the water outlet valve 460 closed 464, the water treatment system 400 waits 464 for the water outlet valve to open 468. With the water outlet valve 460 open 468, if a booster pump 472 is present and on 476 (e.g., energized), a boosted flow 480 of treated water is discharged from the water treatment system 400. With the water outlet valve 460 open 468, if the booster pump 472 is absent or off (de-energized) 484, a water flow is discharged by gravity 488. It will be noted that any pressure differential of contents within the storage container 432 as compared to ambient air pressure may also effect the discharge of the treated water through the outlet. Further, as treated water is discharged 480, 488, internal pressure 436 may drop so as to open 448 the overflow device to admit air 452 into the storage container. Similarly, when the float valve 408 is open 416 so water flows into and through the water treatment system 400, the overflow device may open 440 to vent air from the storage container.

Figure 5:
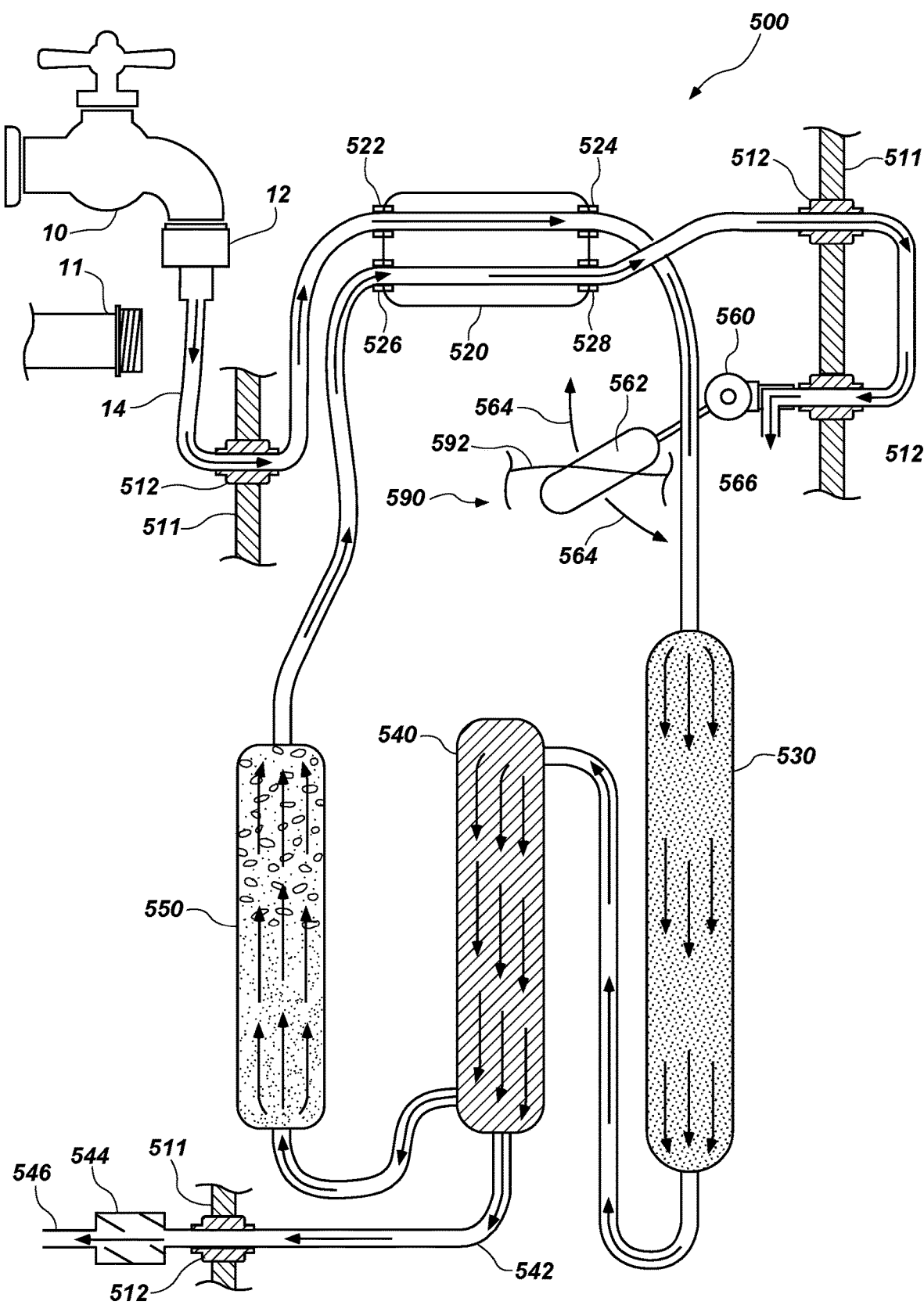
FIG. 5 is a system diagram for a water treatment system according to some embodiments.

FIG. 5 is a simplified system diagram for a water treatment system 500 according to some embodiments. The water treatment system 500 is similar to the water treatment system 400 of FIG. 4, and may be included in the water provision apparatus 100, 300 of FIGS. 1A-3D. Furthermore, in some embodiments, the water treatment system 500 may operate in accordance with the flow diagram of FIG. 4.

The water treatment system 500 may be connected to an external water supply, such as a spigot 10 or water hose 11, which may be configured to provide untreated water. More particularly, a connector/adaptor 12 may couple a water supply line 14 of the water treatment system 500 to the spigot 10 or hose 11. The water supply line 14 may pass through a wall 511 of a storage container (e.g., the storage containers 110, 310, and 432 of FIGS. 1A-1B, 3A-3B, and 4) and into a pressure-sensitive solenoid ("solenoid") 520. The solenoid 520 may comprise a first inlet 522, a second inlet 526, a first outlet 524, and second outlet 528. The water supply line 14 may communicate untreated water from the water supply 10 or 11 to the first inlet 522 of the solenoid 520. The untreated water may pass through the solenoid 520 to the first outlet 524. From the first outlet 524 of the solenoid 520, the water may be communicated to a particulate matter filter (PM filter) 530.

The PM filter 530 may be configured to remove particles from the untreated water. The PM filter 530 may be similar to the PM filter 170 of FIG. 2A and the PM filter used for particulate matter filtration 420 as discussed with reference to FIG. 4. More particularly, the PM filter 350 may collect from the untreated water insoluble solids, such as sand, soil particles, vegetable debris, etc., while permitting the water to continue to flow through the water treatment system 500. The PM filter 530 may be configured to remove insoluble solids above a particular size such that any insoluble solids remaining in the water may be insignificant to a surface, finish, or material of a vehicle which may be washed (including rinsing, etc.) with water from the water treatment system 500.

From the PM filter 530, the water (filtered water) may be communicated to a reverse osmosis unit ("RO unit") 540. The RO unit 540 may be similar to the RO unit 180 of FIG. 2A and the RO unit used to perform the reverse osmosis 424 discussed above with reference to FIG. 4. The RO unit 540 may be configured to remove impurities from the filtered water. The RO unit 540 may divert from the filtered water dissolved soluble substances which may be harmful to a surface, finish, or material of a vehicle. By way of non-limiting example, the RO unit 540 may be configured to achieve electroconductivity/-resistivity of the water not to exceed 10 μohm/cm and 100 kΩ. More particularly, the RO unit 540 may be configured to achieve electroconductivity/-resistivity of approximately 50 μohm/cm and 50 kΩ. In some embodiments, the treated water has a purity with a conductivity below 12 ppm.

The RO unit 540 may produce reject water and purified water. The reject water may be diverted by the RO unit 540 through a reject water tube 542 to be delivered to an exterior of the water treatment system 500. More particularly, the reject water tube 542 may pass through a back pressure regulator 544 before or after exiting through a wall 511 of the storage container 110, 310, 432. In some embodiments, the reject water may flow out 546 of the reject water tube 542 to, for example, a waste water collection system. In some embodiments, the reject water may flow out 546 of the reject water tube 542 and onto the ground. In some embodiments, a drain (not shown) may be located near the wall 511 through which the reject water exits 546.

The purified water may be communicated to an ion exchange unit ("IX unit") 550. The IX unit 550 may comprise, for example, an ion exchange resin cartridge (not shown). The IX unit 550 may be similar to the IX unit 190 of FIG. 2A and the IX unit used to perform the ion exchange 428 of FIG. 4. The IX unit 550 may remove minerals from the filtered and purified water. The purified water from the RO unit 540 may still contain cations and anions of dissolved minerals which may be harmful to a surface, finish, or material of a vehicle. The IX unit 550 may replace (exchange) the harmful cations with cations less likely to affect a surface, finish or material of a vehicle. Similarly, the IX unit 550 may replace (exchange) the harmful anions with anions less likely to affect a surface, finish, or material of a vehicle. In one embodiment, the IX unit 550 may remove such harmful cations and anions. Water purified to this degree of electroconductivity/-resistivity is unlikely to form water spots at earth surface standard conditions, and is unlikely to affect a surface or finish of a vehicle.

From the IX unit 550, the water (treated water) may be communicated to the second inlet 526 of the solenoid 520, then to the second outlet 528 of the solenoid 520. From the second outlet 528 of the solenoid 520, the water may be communicated to a float valve 560. In the embodiment of FIG. 5, the water supply line 14 may exit through a wall 511 of the storage container 110 in order to couple at an end of the float valve 560 so as to properly dispose the float valve 560 at the wall 511 of the storage container 110. The float valve 560 may comprise a float 562. The float 562 may be configured to articulate 564 in response to a level 592 of stored treated water 590 within the storage unit 110. As the water level 592 diminishes, the float 562 may articulate so as to open the float valve 560. With the float valve 560 opened, water may circulate through the water treatment system 500 and treated water may move forward through the float valve 560, which may hydrostatically decrease a pressure within the water supply line 14, which may, in turn, cause the solenoid 520 to permit treated water to flow toward the float valve 560 and, simultaneously, untreated water toward the PM filter 530, RO unit 540, and IX unit 550.

At each location where the water supply line 14 passes through a wall 511 of the storage container 110, a seal component 512 may be disposed about the circumference of the water supply line 14 so as to create a water tight seal.

FIG. 6 is a simplified cross-sectional view of an example water provision apparatus 600, according to some embodiments. In some embodiments of the water provision apparatus 100 of FIGS. 1A-1C may include the example water provision apparatus 600. In such embodiments, the cross-sectional view depicted by FIG. 6 may be taken along lines 6 of FIG. 1A. Also, features of FIG. 6 that are similar to features of FIGS. 1A-1C are designated with reference numerals of FIGS. 1A-1C, with the leading digits incremented to "6." For example, the embodiment depicted in FIG. 6 includes a storage container 610 that may, in some respects, resemble the storage container 110 of FIGS. 1A-1C. Relevant disclosure set forth above regarding similarly identified features thus may not be repeated hereafter. Moreover, specific features of the water provision apparatus 100, as well as 300, 400, 500 and related components shown in FIGS. 1A-5 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the water provision apparatus 600 and related components depicted in FIG. 6. Any suitable combination of the features, and variations of the same, described with respect to the water provision apparatus 100, 300 and the water treatment system 400, 500 and related components illustrated in FIGS. 1A-5 can be employed with the water provision apparatus 600 and related components of FIG. 6, and vice versa. This pattern of disclosure applies equally to further embodiments depicted in subsequent figures (e.g., FIGS. 7 and 8) and described hereafter, wherein the leading digits may, in some instances, be further incremented.

The water provision apparatus 600 comprises a storage container 610, a particulate matter filter (PM filter) 630, a reverse osmosis unit (RO unit) 640, and an ion exchange unit (IX unit) 650. The PM filter 630, the RO unit 640, and the IX unit 650 may be coupled to an underside of a lid 616 of the storage container 610. For example, a bracket 632 may enclose a portion of the PM filter 630 and be affixed via attachment hardware 634 to an underside of the lid 616. Likewise, a portion of the RO unit 640 may be enclosed by a bracket 642, which may couple to an underside of the lid 616 by the attachment hardware 634. Similarly, the IX unit 650 may comprise, or have coupled thereto, a flange 652 which couples the IX unit 640 to an underside of the lid 616 by the attachment hardware 634. Treated water 690 is contained within the storage container 610. The quantity of treated water 690 in the storage container 610 is by way of example only.

In embodiments where the lid 616 couples to the storage container 610 with a hinge, it may be convenient to service components (e.g., the PM filter 630, the RO unit 640, the IX unit 650, etc.) of the water provision apparatus 600 by opening the lid 616, which may at least partially withdraw the components from the storage container 610.

It should be noted that in some embodiments the underside of the lid 616 may include pre-molded mounts for the PM filter 630, the RO unit 640, the IX unit 650, or combinations thereof. In such embodiments, the attachment hardware 634 may be omitted or supplanted by pre-molded fittings on the underside of the lid 616.

FIG. 7 is a simplified cross-sectional view of a water provision apparatus 700, according to some embodiments. The water provision apparatus 700 includes a storage container 710, a PM filter 730, an RO unit 740, and an IX unit 750 similar to the storage container 610, the PM filter 630, the RO unit 640, and the IX unit 650 of FIG. 6. The water provision apparatus 700 includes a lid 716, which is shown in a partially open position in FIG. 7. Although the water provision apparatus 700 includes the lid 716, the PM filter 730, the RO unit 740, and the IX unit 750 are not mounted to the underside of the lid 716 in FIG. 7. Rather, the PM filter 730, the RO unit 740, and the IX unit 750 are mounted to a barrier 718 near a top of the storage container 710. Treated water 790 is shown in the storage container 710 for reference.

The barrier 718 may be formed to define a well 720 in the top of the storage container 710. The well 720 may be configured to accommodate at least a portion of the PM filter 730, the RO unit 740, and the IX unit 750. As shown in FIG. 7, one or more of the PM filter 730 and the RO unit 740 may rest on and/or be secured to an upper surface of the barrier 718 within a configured portion of the well 720.

In some embodiments, the IX unit 750 may pass through an aperture within the barrier 718 and couple to the barrier 718 (e.g., via suitable attachment hardware, pre-molded mounts on or in the barrier 718, or combinations thereof). In an embodiment such as that of FIG. 7, the barrier 718 may have a handle similar to the handle 117 of FIG. 1A, and may also be configured so as to allow a hasp, such as the hasp 115 of FIG. 1A, to pass through such that a lock may be accommodated to secure the lid 716 and barrier 718 to prevent opening by, for example, a child, an animal, a gust of wind, etc.

Other configurations of the lid 716 and barrier 718 are contemplated by the disclosure. For example, an underside of the lid 716 may be configured, for example, by a molded shape, to receive the PM filter 730, RO unit 740, and IX unit 750 by friction fit, snap-in/snap-to molded piece, etc.

Figure 8:
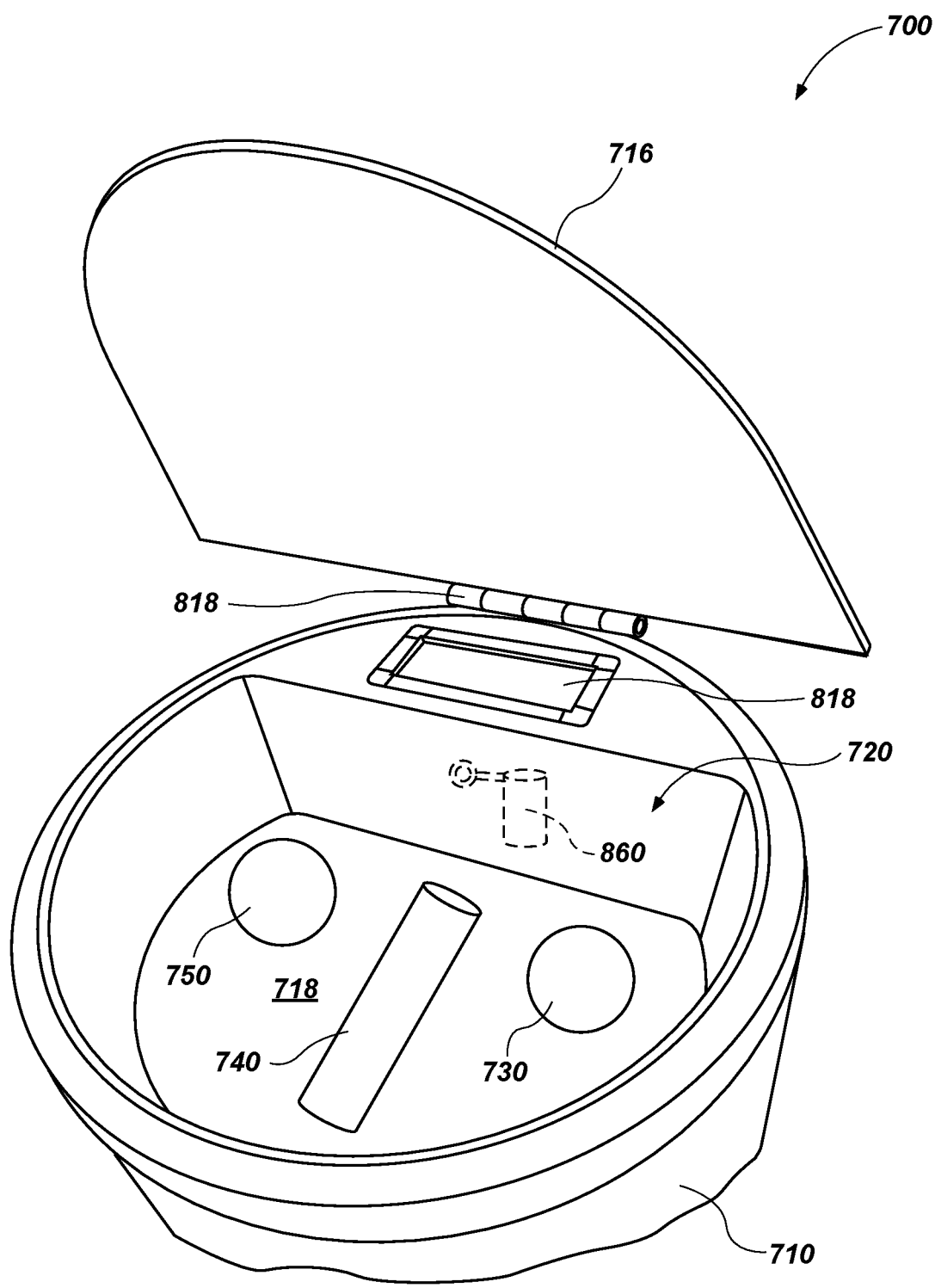
FIG. 8 is a top perspective view of the water provision apparatus of FIG. 7.

FIG. 8 is a simplified top perspective view of the water provision apparatus 700 of FIG. 7. As previously discussed, the water provision apparatus 700 includes the storage container 710, the lid 716, the barrier 718, the well 720, the PM filter 730, the RO unit 740, and the IX unit 750. FIG. 7 also illustrates a hinge 818 for the lid 716 and a float valve 860.

In some embodiments, the PM filter 730 and the IX unit 750 may include two inch (2") by ten inch (10") housings. In some embodiments, the bodies of these housings may penetrate through the barrier 718. A portion (e.g., about three inches) of the bodies of the housings of the PM filter 730 and the IX unit 750 may extend above the barrier 718 into the well 720.

In some embodiments, the float valve 860 may be housed inside the storage container 710 and mounted to a sidewall or bottom of the barrier 718 in any of various configurations. In some embodiments, a pressure sensitive solenoid (e.g., the solenoid 162, 520) (not shown) may be mounted to a bottom of the barrier 718 or a top of the barrier 718 within the well 720.

The barrier 718 may be configured to prevent a person (e.g., a child) from falling into the storage container 710, which could result in the person suffocating or drowning. Accordingly, the barrier 718 may include a rigid material. In some embodiments, the barrier 718 may include an at least substantially continuous material. In some embodiments, the barrier 718 may include a rigid mesh.

FIGS. 7 and 8 illustrate the PM filter 730, the RO unit 740, and the IX unit 750 as coupled to the barrier 718 rather than to the lid 716 (in contrast to similar elements being coupled to the lid 616 in FIG. 6). It will be apparent, however, that in some embodiments one or more of the PM filter 730, the RO unit 740, or the IX unit 750 may be coupled to the barrier 718, and one or more others of the PM filter 730, the RO unit 740, or the IX unit 750 may be coupled to the lid 716.

Regardless of whether the PM filter 730, the RO unit 740, and the IX unit 750 are coupled to the lid 716 or the barrier 718, holes, notches, or grooves may be formed in the barrier 718 to accommodate the geometry of the PM filter 730, the RO unit 740, and/or the IX unit 750 as needed or desired. By way of non-limiting example, the PM filter 730, the RO unit 740, and/or the IX unit 750 may be coupled to the lid and extend vertically downward through a hole or into a recess defined by the barrier 718.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Figure 9:
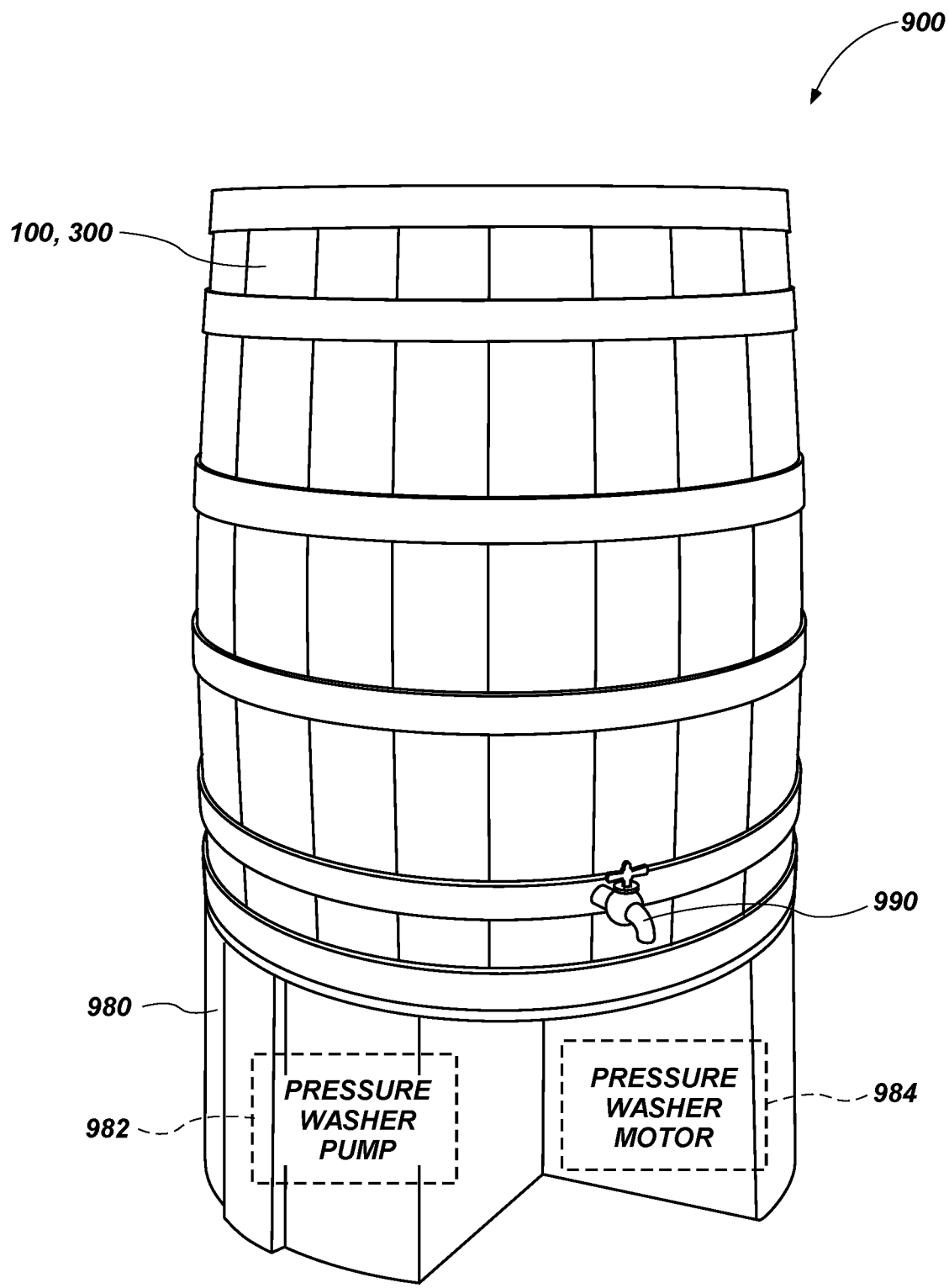
FIG. 9 is a front perspective view of a water provision apparatus, according to some embodiments.

FIG. 9 is a front perspective view of a water provision apparatus 900, according to some embodiments. The water provision apparatus 900 includes a water provision apparatus 100, 300, similar to those discussed above. The water provision apparatus 100, 300 includes a water treatment system 400, 500 housed therein within the same container as treated water. The water provision apparatus 900 also includes a base unit 980. The base unit 980 is configured to elevate the water provision apparatus 100, 300 above the ground. The base unit 980 also houses a pressure washer system including a pressure washer pump 982 and a pressure washer motor 984 within a cavity defined within the base unit 980. In such embodiments, a booster pump 330 (FIG. 3A), 472 (FIG. 4) may not be needed to feed an external pressure washer. In some embodiments the water provision apparatus 100, 300 includes a base outlet configured to deliver treated water stored in the water provision apparatus 100, 300 to the pressure washer pump 982 and the pressure water pump 984. The pressure washer pump 982 and the pressure washer motor 984 are configured to pressurize the treated water, and deliver the treated water to a water outlet 990 of the water provision apparatus 900. The inclusion of the pressure washer pump 982 and the pressure washer motor 984 in the base unit 980 enables the water provision apparatus 900 to provide a pressure wash with treated water treated in accordance with embodiments disclosed herein.

In some embodiments the base unit 980 includes a decorative shape and/or a decorative texture on at least a portion of an exterior of the base unit 980, similar or complementary to that of the water provision apparatus 100, 300, as discussed above. In some embodiments, the base unit 980 and the storage container of the water provision apparatus 100, 300 may together form an integral, one-piece unit. In some embodiments, the base unit 980 may be injection molded while the storage container of the water provision apparatus 100, 300 may be roto-molded.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. A vehicle wash water provision apparatus, comprising:
   a container configured to store treated water for use in washing vehicles, the container configured to seal the treated water from contaminants in ambient air, the container comprising a water inlet configured to receive untreated water and a water outlet configured to deliver the treated water;
   a particulate filter within the container, the particulate filter configured to receive the untreated water from the water inlet, the particulate filter configured to remove particles from the untreated water to provide filtered water;
   a reverse osmosis (RO) filter within the container, the RO filter configured to receive the filtered water from the particulate filter, the RO filter configured to remove dissolved impurities from the filtered water and deliver purified water;
   an ion exchange (IX) resin cartridge within the container, the IX resin cartridge configured to remove minerals from the purified water and provide the treated water; and
   a float switch mounted to an underside of a lid or to a wall of the container, wherein the float switch delivers the treated water provided by the IX resin cartridge to the container when a level of the treated water within the container drops below a threshold level that is monitored by the float switch.

2. The vehicle wash water provision apparatus of claim 1, further comprising a booster pump within the container, the booster pump configured to pressurize the treated water to sufficient pressure to feed, from the water outlet, a pressure washer, wherein the sufficient pressure is ten to twenty pounds per square inch (10-20 psi).

3. The vehicle wash water provision apparatus of claim 1, wherein the container comprises a texture of at least a portion of an outer surface of the container.

4. The vehicle wash water provision apparatus of claim 1, wherein a back side of the container is at least substantially flat to enable the container to be placed flush with a flat, vertical surface.

5. The vehicle wash water provision apparatus of claim 1, further comprising an RO reject drain including a back-pressure regulator configured to maintain a back pressure against the RO filter.

6. The vehicle wash water provision apparatus of claim 1, wherein the IX resin cartridge comprises a twin bed, cation and anion resin designed to provide a water purity not to exceed 100,000 ohms centimeter (100 KΩ-cm).

7. The vehicle wash water provision apparatus of claim 1, wherein the water outlet comprises a single-piece fitting extending through a wall of the container, a first portion of the single-piece fitting that is internal to the container connected to a hose from a booster pump configured to pressurize the treated water, a second portion of the single-piece fitting that is external to the container including a connector configured to connect to a hose.

8. The vehicle wash water provision apparatus of claim 1, further comprising an overflow device that is single component that includes a pressure relief valve (PRV), a vacuum relief valve (VRV), and a particle matter (PM) filter, the overflow device configured to:
   allow water to exit the container if the container becomes overfilled;

displace air from within the container to outside the container as the container is filled with treated water; and filter and displace air from outside the container to inside the container as the container is emptied to prevent contaminants in the air outside the container from contaminating the treated water.

9. The vehicle wash water provision apparatus of claim 1, further comprising a lid configured to seal to a top of the container, wherein the particulate filter, the RO filter, and the IX resin cartridge are mounted from a bottom of the lid or an underside of a top surface of the container to be enclosed within the container when the lid is in a closed configuration, wherein the IX resin cartridge is vertically mounted from the bottom of the lid of the container or the underside of the top surface of the container.

10. The vehicle wash water provision apparatus of claim 9, wherein the lid is mounted to the container with a hinge, and wherein the lid may be a partial or full diameter of an opening of the container.

11. The vehicle wash water provision apparatus of claim 9, wherein the bottom of the lid or the underside of the top surface of the container comprises pre-molded mounts for the particulate filter, the RO filter, and the IX resin cartridge.

12. The vehicle wash water provision apparatus of claim 1, wherein the treated water has a purity with a resistivity not to exceed one hundred thousand ohms centimeter (100 KΩ-cm).

13. The vehicle wash water provision apparatus of claim 1, wherein the container is configured to store at least fifteen gallons (15 gal) of treated water.

14. The vehicle wash water provision apparatus of claim 1, wherein the float switch is configured to cut off supply of the purified water to the IX resin cartridge when the level of the treated water exceeds the threshold, but a pressure sensitive solenoid is configured to allow a trickle flow to continue on an outer surface of a membrane of the RO filter when the level of the treated water exceeds the threshold.

15. The vehicle wash water provision apparatus of claim 1, further comprising a float switch hose connecting the IX resin cartridge to the float switch, the hose extending from the IX resin cartridge through the wall of the container, outside of the container, and once again into the container through the float switch.

16. The vehicle wash water provision apparatus of claim 1, wherein when the container is placed in the sun, the container is configured to communicate heat from the sun to the treated water.

17. The vehicle wash water provision apparatus of claim 1, further comprising a base unit including a pressure washer pump and a pressure washer motor to enable a pressure wash, wherein the pressure water pump and the pressure washer motor are configured to pressurize the treated water to between about 1,700 to 2,500 pounds per square inch (psi) with a 1.2 to 6 gallons per minute (gpm) output.

18. A vehicle wash water provision apparatus, comprising:

a container configured to store treated water for use in washing vehicles, the container configured to seal the treated water from contaminants in ambient air, the container comprising a water inlet configured to receive untreated water and a water outlet configured to deliver the treated water;

a particulate filter within the container, the particulate filter configured to receive the untreated water from the water inlet, the particulate filter configured to remove particles from the untreated water to provide filtered water;

a reverse osmosis (RO) filter within the container, the RO filter configured to receive the filtered water from the particulate filter, the RO filter configured to remove dissolved impurities from the filtered water and deliver purified water; and an ion exchange (IX) resin cartridge within the container, the IX resin cartridge configured to remove minerals from the purified water and provide the treated water, wherein a lid is mounted to the container with a hinge, and wherein the lid may be a partial or full diameter of an opening of the container.

* * * * *